(12) United States Patent
Yoshinaga

(10) Patent No.: US 6,886,732 B2
(45) Date of Patent: May 3, 2005

(54) FRICTION STIR WELDING DEVICE WITH DETECTOR FOR DETECTING TORQUE CURRENT OF FRICTION STIR WELDING TOOL

(75) Inventor: Fumio Yoshinaga, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 346 days.

(21) Appl. No.: 10/228,061

(22) Filed: Aug. 27, 2002

(65) Prior Publication Data

US 2002/0190103 A1 Dec. 19, 2002

Related U.S. Application Data

(62) Division of application No. 09/791,667, filed on Feb. 26, 2001.

(30) Foreign Application Priority Data

Oct. 27, 2000 (JP) ........................................ 2000-328078

(51) Int. Cl.[7] ........................ B23K 20/12; B23K 37/00; B23K 13/08
(52) U.S. Cl. .............................. 228/2.3; 228/2.1; 228/8
(58) Field of Search ........................ 228/2.1, 2.3, 8–12, 228/47.1, 110.1

(56) References Cited

U.S. PATENT DOCUMENTS

| | | | | |
|---|---|---|---|---|
| 5,460,317 A | * | 10/1995 | Thomas et al. ........... | 228/112.1 |
| 5,697,544 A | * | 12/1997 | Wykes ........................ | 228/2.1 |
| 5,713,507 A | * | 2/1998 | Holt et al. ................. | 228/112.1 |
| 5,893,507 A | * | 4/1999 | Ding et al. ................ | 228/2.1 |
| 6,050,475 A | * | 4/2000 | Kinton et al. ............. | 228/112.1 |
| 6,168,066 B1 | * | 1/2001 | Arbegast .................... | 228/102 |
| 6,199,745 B1 | * | 3/2001 | Campbell et al. ........ | 228/112.1 |
| 6,299,050 B1 | * | 10/2001 | Okamura et al. ........ | 228/110.1 |
| 6,421,578 B1 | * | 7/2002 | Adams et al. ............. | 700/212 |
| 6,497,355 B1 | * | 12/2002 | Ding et al. ................ | 228/2.1 |
| 6,499,649 B2 | * | 12/2002 | Sayama et al. .......... | 228/112.1 |

FOREIGN PATENT DOCUMENTS

| | | |
|---|---|---|
| JP | 05-008136 | 1/1993 |
| JP | 6-61401 | 8/1994 |
| JP | 10-071477 | 3/1998 |
| JP | 10-175089 | 6/1998 |
| JP | 2000-042759 | 2/2000 |
| JP | 2000-512557 | 9/2000 |

OTHER PUBLICATIONS

Collected Papers for Tokushima Lecture Presentation (Oct. 28, 2000). Japanese Society of Mechanical Engineers, Chugoku/Shikoku–based affiliate, pp. 279–282.

* cited by examiner

Primary Examiner—Tom Dunn
Assistant Examiner—Colleen P. Cooke
(74) Attorney, Agent, or Firm—Antonelli, Terry, Stout & Kraus, LLP

(57) ABSTRACT

A machining device comprising five axial kinetic coordinate systems that can be controlled simultaneously, three axes of which, are linear moving axes and two axes of which are rotary axes, with one axis of the five axes being provided with a tool rotating function, whereby said machining device is equipped with a cutting tool 51 and a friction stir welding tool 52. The current value observed when a large-diameter portion of said tool 52 contacts the work object is set in advance, and by observing the torque current of the rotary shaft of the tool 52 during friction stir welding, the insertion depth of the tool 52 can be controlled by maintaining the observed torque current above the preset current value, thus providing a good weld. A single device can provide both the cutting and the welding. Thus, it is possible to reduce equipment cost, installation space, plant area, lead time and production cost.

10 Claims, 7 Drawing Sheets

X, Y, Z : linear moving axis
B: rotation around axis Y
C: rotation around axis Z R: normal of contact surface
A: tool axis
θ: frontward inclination of tool Is: torque current when whole small-diameter portion of tool is inserted
Iα: torque current when whole end surface of large-diameter portion of tool contacts joint portion X, Y, Z: linear moving axis
B: rotation around axis X
C: rotation around axis Y

FRICTION STIR WELDING DEVICE WITH DETECTOR FOR DETECTING TORQUE CURRENT OF FRICTION STIR WELDING TOOL

This application is a Divisional application of Ser. No. 09/791,667, filed Feb. 26, 2001, the contents of which are incorporated herein by reference in their entirety.

FIELD OF THE INVENTION

The present invention relates to a method and device for cutting and friction-stir-welding of metal material. For example, the present invention is preferably applied to the machining and assembling of mechanical parts or structural parts.

DESCRIPTION OF THE RELATED ART

When machining and assembling mechanical parts or structural parts and the like, separate machining devices are used; for example, a cutting machine tool is used for the cutting process, and various welding/bonding devices are used for the assembling process.

Compound machining carried out by a single cutting machine tool usually involves a combination of cutting processes, such as turning and rotary tool machining using a compound engine lathe, or a rotary tool machining and bite machining using a machining center. One example of a combination of a cutting process with another process is the combination of rotary tool machining and laser hardening.

One example of a method of joining members is friction stir welding (refer to Japanese Patent Laid-Open Publication No. 11-90655, U.S. Pat. No. 6,050,474). The method includes inserting a round shaft (called a rotary tool) into a joint portion between members to be joined, and rotating and moving the rotary tool along the joint portion, thereby heating, mobilizing and plasticizing the material to effect solid-phase welding the joint portion. The, rotary tool comprises a small-diameter portion (called a pin) to be inserted into the joint portion, and a large-diameter portion (called a shoulder) positioned to the exterior. The small-diameter portion and the large-diameter portion are coaxial. The large-diameter-portion is coupled to a drive so as to be rotated. The joint portion is provided with a raised portion.

Further, as disclosed in Japanese Patent Laid-Open Publication No. 9-508073 (EP0752926B1), the rotary tool is tilted when being inserted into the welding joint so that the small-diameter portion of the rotary tool is angled and leads the large-diameter portion in the direction of movement of the tool. In other words, the rotary tool is tilted rearwards.

SUMMARY OF THE INVENTION

As explained above, no conventional machining device is designed and manufactured to carry out both cutting and welding using a single machining device.

Therefore, in order to carry out both a cutting process and a welding process, two separate machining devices, i.e. a cutting device and a bonding device, are needed. This leads to problems, such as a high equipment cost, a large installation space, a large plant building, a long lead time caused by the waiting time between the cutting process and the bonding process, and the need to provide operators for the cutting and bonding processes.

The present invention aims at providing a compound machining device which is capable of carrying out the cutting and bonding processes using a single device.

The object of the present invention is achieved by a device comprising linear movement devices capable of moving in directions X, Y, and Z, respectively; rotary devices capable of rotation about axes A and B, respectively; a control unit capable of simultaneously controlling the five coordinate systems; a main shaft for rotating a tool, a storage device for storing a plurality of tools for the main shaft; and an exchange device for exchanging tools between the main shaft and the storage device; wherein the storage device is capable of storing a cutting tool and a friction stir welding tool; and the control unit mounts either the cutting tool or the friction stir welding tool to the main shaft from the storage device using the exchange device based on a program, and performs machining using the tool mounted to the main shaft.

DETAILED DESCRIPTION OF PREFERRED EMBODIMENTS

Figure 1:
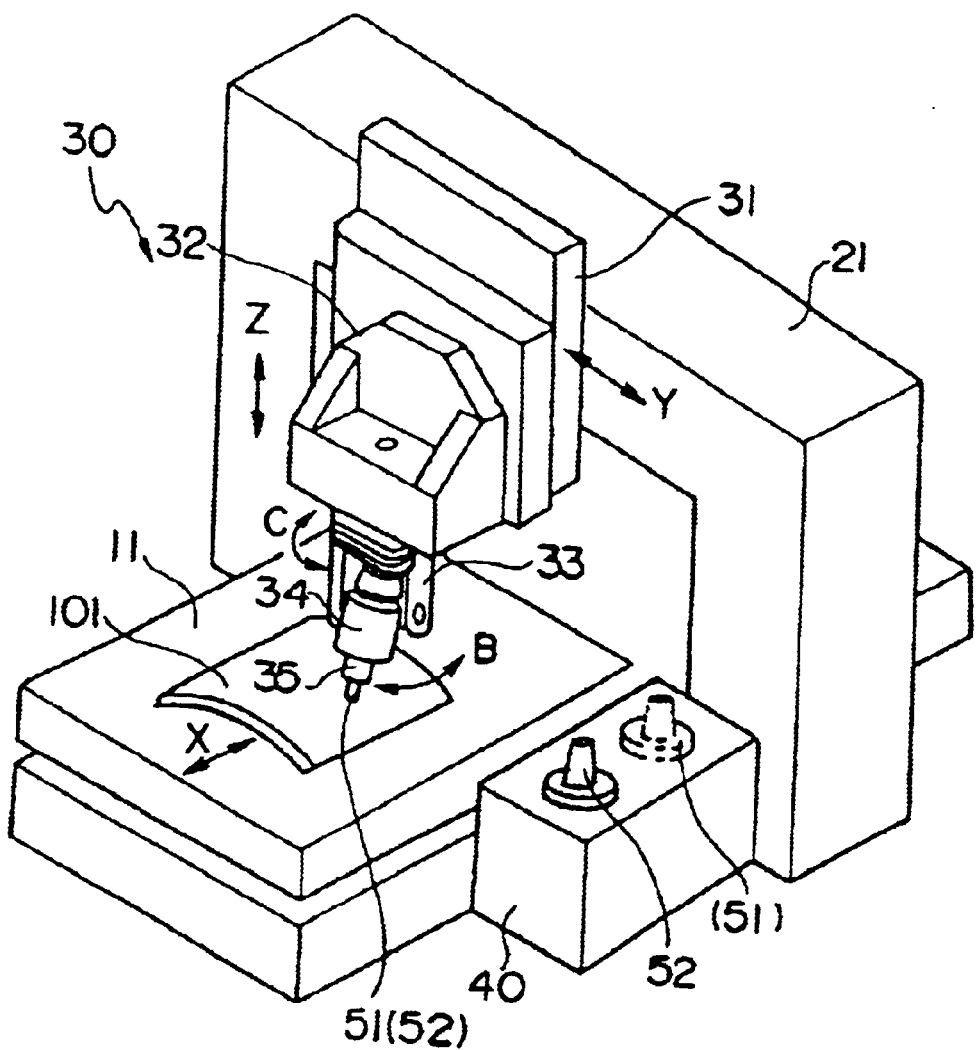
FIG. 1 is a perspective view showing the machining device according to one embodiment of the present invention.

One preferred embodiment of the present invention related to a machining-center-type compound machining device will be described with reference to FIGS. 1 through 6. The device comprises a table (moving base) 11 capable of moving in the direction of the axis X, a moving base 31 mounted on a beam 21 positioned above the table 11 and capable of moving in the direction of the axis Y, a moving base 32 mounted on the moving base 31 and capable of moving in the direction of the axis Z, a rotary base 33 mounted on the moving base 32 and capable of rotating around an axis C, a rotary base 34 mounted on the rotating base 33 and capable of rotating around an axis B, and a main shaft 35 mounted on the rotary base 34 for rotating the tool fixed thereto. The rotary base 34 comprises a motor for rotating the main shaft 35.

A cutting tool 51 or a friction stir welding tool 52 can be selectively fixed to the main shaft 35. The main shaft 35 can be rotated in speeds appropriate for tool 51 or tool 52. A tool storage device 40 is not shown in the drawing, but can store a plural number of cutting tools 51 and friction stir welding tools 52. Through the use of a tool exchange device (not shown) the tools can be exchanged between the main shaft 35 and the tool storage device 40, thereby mounting a desired tool 51 or 52 to the main shaft 35. Further, not only the tools but also a so-called machining head including the tool, the bearing of the tool and the like, can be exchanged. A known technology is utilized in the driving means driving each moving base 11, 31, 32 enabling movement in directions X, Y and Z, the driving means of rotary bases 33 and 34, and the tool exchange device.

A compound machining device preferably applied to the cutting and the friction stir welding of a tridimensional structure is obtained by simultaneously controlling five axes, which comprise three linear movement axes and two axial rotation axes.

A work object 101 is mounted on the table 11. The work object 101 is a panel member in the shape of a curved plate.

Figure 2:
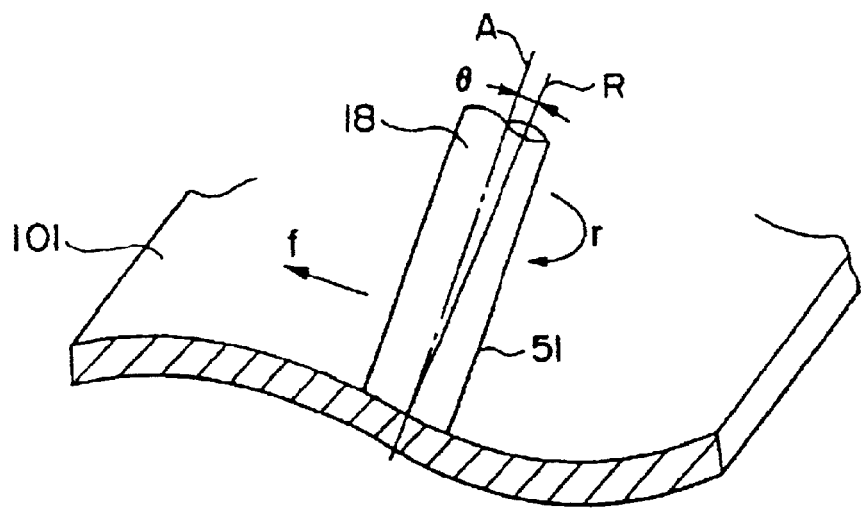
FIG. 2 is a perspective view showing the cutting process performed by the compound machining device.

FIG. 2 will be referred to in explaining the cutting process. In a five-axis cutting process, the main shaft 35 (the rotation axis of tool 51 or 52) can be moved to take a right angle to the curved surface of the work object 101. Therefore, in comparison to the conventional processes utilizing two or three axes not capable of being tilted relative to the position of the tool, the present embodiment realizes a shorter tool protrusion length, enabling the tool to maintain great rigidity. Therefore, the present device makes its possible to provide a highly efficient cutting process with increased cutting speed without causing much chatter or vibration.

Moreover, in the five-axis cutting process, the position of the main shaft 35 can be set with freedom, so the axis A of the cutting tool 51 can be tilted rearward from the normal position R at the joint of the work object; in other words, the tool can be tilted rearwards relative to the curved surface during the process. In using a flat tool, the cutting edge can be partially used for cutting. Therefore, compared to the cutting process where the whole surface is used, the cutting resist is reduced, thereby enabling a highly efficient cutting process with increased cutting speed without causing much chatter or vibration.

Figure 3:
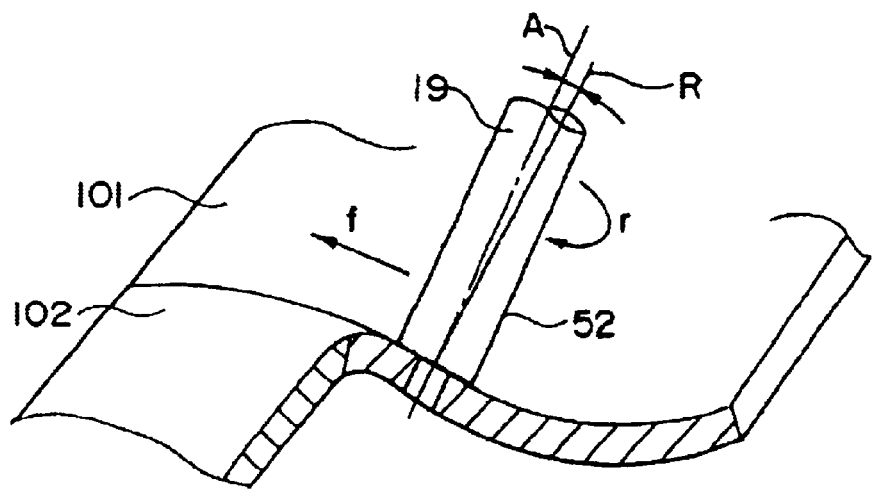
FIG. 3 is a perspective view showing the friction stir welding process performed by the compound machining device.
Figure 4:
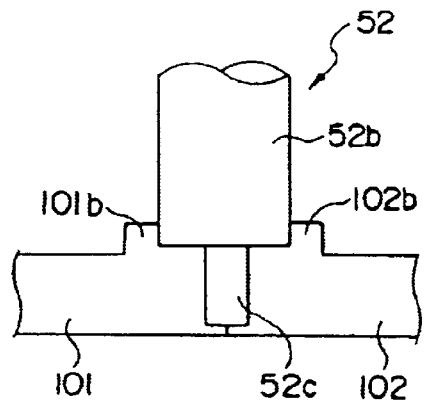
FIG. 4 is a vertical cross-sectional view showing the friction stir welding process.

FIG. 3 and FIG. 4 will now be referred to in explaining the friction stir welding. The abutted area of work objects 101 and 102 are welded. The abutted portions on the ends of objects 101 and 102 are each provided with raised portions 101b and 102b protruding in the upper direction. The work objects 101 and 102 are manufactured by the above-explained cutting process. FIG. 3 does not show the raised portions 101b and 102b. FIG. 4 shows the raised portions 101b and 102b. The work objects 101 and 102 are panels having curved surfaces. The friction stir welding tool 52 comprises a large-diameter portion 52b and a small-diameter portion 52c mounted on the tip of the portion 52b. The small-diameter portion 52c is inserted into the joint to be welded together. The lowermost end of the large-diameter portion 52b is inserted to a level between the top surface of the raised portions 101b, 102b and the plane of the upper surface of the work object excluding the raised portions 101b, 102b. The width of the two raised portions 101b and 102b is greater than the diameter of the large-diameter portion 52b. The axis A of the tool 52 is tilted so that the axial center of the large-diameter portion 52b is positioned behind the axial center of the small-diameter portion 52c in the direction of movement of the tool 52. The friction stir welding is carried out by moving the tool 52 along the abutted portion (welding line) while rotating the tool 52.

The work objects 101 and 102 are mounted on the table 11 via a supporting base (not shown). The objects 101 and 102 are fixed strongly onto the table 11 via the supporting base. Especially, the supporting base should be positioned below the abutted portion to be welded together. This is for supporting the large load generated when performing the friction stir welding.

Even when a gap exists between the abutted portions of the two work, objects 101 and 102, the metal material of the raised portions 101b, 102b pressed by the large-diameter portion 52b will act as the source material for filling the gap, so a good bond is obtained.

When the raised portions 101b and 102b do not exist, the bonded area will have a depression since the large-diameter portion 52b is somewhat inserted into the surface of the objects 101 and 102 when the friction stir welding is performed.

It is effective to simultaneously control the five axes of the kinetic coordinate systems in order to move the tool along a curved surface while tilting the tool relative to the direction of movement, or to move the tool at a desired position.

Since there may be fabrication errors in the work objects 101 or 102, it is very difficult to maintain the insertion position of the tool accurately by moving the tool only based on an NC (numerical control) program.

Figure 5:
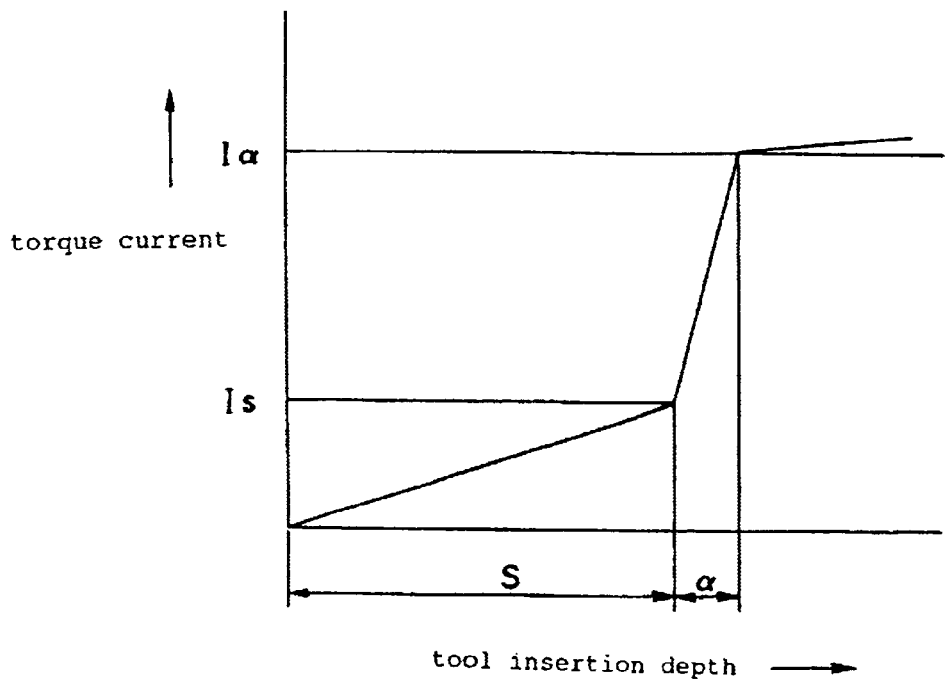
FIG. 5 is a diagram showing the relationship between the insertion depth of the friction stir welding tool and the torque current.

FIG. 5 is a simplified diagram showing the relationship between the torque current of a motor rotating the tool 52 and the insertion depth of the tool 52 when the friction stir welding tool 52 is inserted into the work object. The insertion depth refers to the distance from the surface of the work objects 101 and 102 to the tip of the small-diameter portion 52c. Along with an increase in the insertion depth of the tool 52, the torque current gradually increases and reaches point Is. When the end of the large-diameter portion 52b of the tool 52 begins to enter the work object, the torque current I leaps up to point I$\alpha$. The increase thereafter is gentle since the diameter of the large-diameter portion 52b is fixed.

When the tool 52 is inserted diagonally as aforementioned, the torque current increases gradually as the insertion depth increases, until the tool 52 is at a point of distance S, between the point where the tip of small-diameter portion 52c begins to contact the work object and the point where the edge of the large-diameter 52b portion begins to contact the work object, and reaches Is. When the edge of large-diameter portion 52b begins to enter into the work object, the torque current I leaps, while said large-diameter 52b is at a point of distance x between the edge of large-diameter portion 52b that is still spaced away from said work object and the point where all of the edge of the large-diameter portion 52b contacts the work object, and reaches I$\alpha$.

Therefore, the insertion depth of the tool 52 is controlled so that the torque current value maintains a determined current value above I$\alpha$. Thus, a predetermined insertion depth can be maintained at all times even when the work object has a curved surface or has a fabrication error, which leads to achieving a good friction stir welding.

The torque current I of the tool 52 is obtained by detecting the current value of the motor which drives the main shaft 35. The main shaft 35 is rotated using an AC servomotor or a DC servomotor, so that the torque current can be detected accurately. The torque current is used as a determination value in moving the base 32 up and down, so that the best insertion depth can be maintained at all times. Moreover by observing the torque current, the damage to the tool can be detected as well.

Moreover, the lowered position of the moving base 32 is detected based on the detection of the torque current value I, especially the specific value exceeding I$\alpha$. Thereby, the position of the work objects 101 and 102 are detected. The difference between the detected value and the preset coordinate value of the objects 101, 102 or the NC (numerical control) data for moving the tool 52 is corrected. Thereby, an accurate insertion depth of the tool 52 into the work objects 101 and 102 can be obtained.

The position of the work objects 101 and 102 can also be detected by the method described below. A power circuit via 11, 21, 31, 32, 33, 34, 35, tool 52 and work objects 101 and 102 is prepared. A high-frequency power source and a detector are positioned midway of the circuit. At the beginning of the friction stir welding, the moving base 32 is lowered, and the, tip of the small-diameter portion 52c of the tool 52 is positioned to contact the work objects 101 and 102. At this time, a high-frequency current circuit is composed, and the detector detects the current. The position of the tool 52 at the time of detection is computed. Thereafter, the difference between the detected value and the preset coordinate value of the objects 101 and 102 or the NC (numerical control) data for moving the tool 52 is corrected. Accordingly, an accurate insertion depth is obtained. Thereafter, the insertion depth of the tool 52 can be controlled to a predetermined value based on the detection of the torque current I.

Figure 6:
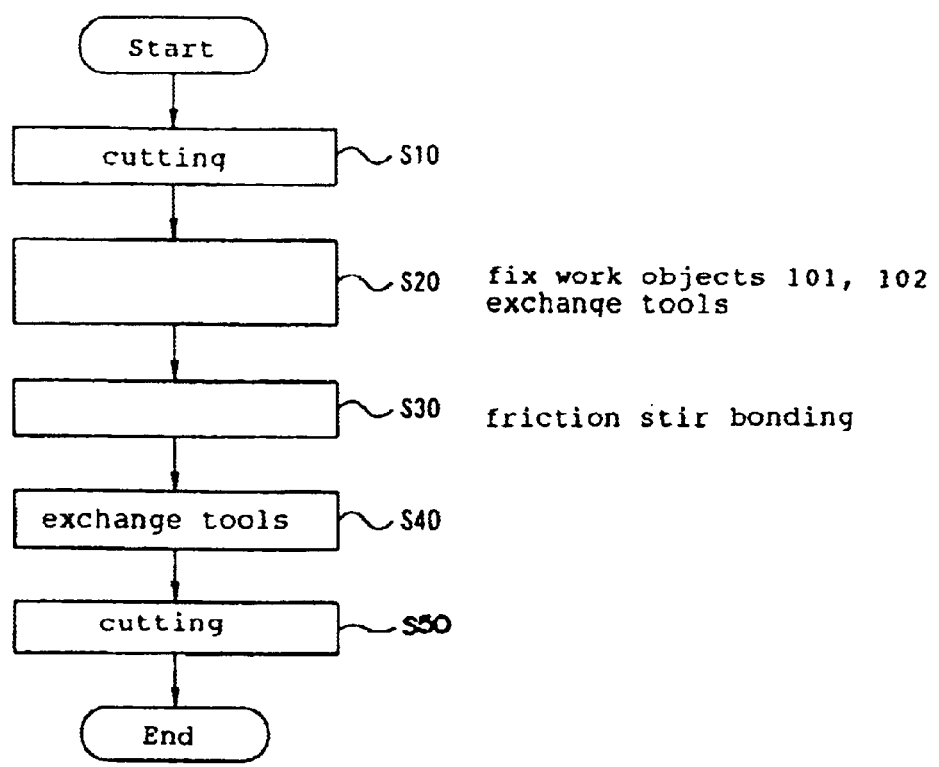
FIG. 6 is a flowchart showing the machining steps according to one embodiment of the present invention.

Next, the steps for manufacturing the work objects will be explained with reference to FIG. 6. The work object 101 is mounted on the table 11, and mainly the upper surface thereof is cut using tool 51. At this time, the upper surface is cut in such a way as to form the raised portion 101b. Next, the work object 101 is removed, and the work object 102 is mounted on the table. The work object 102 goes through a similar cutting process. The work objects 101 and 102 are plates formed of aluminum alloy. The plates have curved surfaces. The cutting process involves dry-cutting and dry-cleaning. When fixing the work object 102 onto the table 11, the object 102 is fixed via a support base, in preparation for the next friction stir welding step (step S10).

Next, the work object 101 is mounted on the table 11 via the support base (not shown), it is abutted against the work object 102, and it is fixed to the table 11. Further, tools are exchanged between the main shaft 35 and the tool storage device 40 using the tool exchange device, and the friction stir welding tool 52 is mounted on the main shaft 35 (step S20).

Next, the main shaft 35 is rotated, and friction stir welding is performed to the abutted portions (step S30).

The tool 52 is rotated, lowered and inserted to a predetermined position, thereby starting the friction stir welding. The vertical position of the objects 101 and 102 can either be detected using a high-frequency current, or by a torque current value I, as explained above. Based on the detected vertical position, the coordinates of the objects 101 and 102 are corrected.

Next, based on the NC data set in advance, the tool 52 is moved along the abutted portion (joint line). While the tool 52 is being moved along the joint line, the insertion depth of the tool 52 is controlled using the torque current value I.

The movement of the tool 52 along the joint line can be controlled using the coordinates set in advance (NC data), but the movement can also be controlled using the data from the detector detecting the position of the joint line. The detector is an optical sensor, which is mounted on the rotary base 34. The detector detects the gap between the abutted portions or the edge of the raised portions 101b and 102b, thereby detecting the position of the abutted portions. The tool 52 is guided to the detected position. Moreover, the coordinates can be corrected by the detected data for guiding the tool 52. Further, an optical sensor can be used to detect the height of the raised portions 101b and 102b, so as to control the insertion depth.

Next, after terminating the friction stir welding, the tool on the main shaft 35 is switched to the cutting tool 51 (step S40).

Next, the cutting process is performed (step S50). The cutting involves cutting what remains of the raised portions 101b and 102b of the abutted portions. Thereby, the abutted portions will substantially constitute a uniform surface with the curved surface of the other areas. This is effective when using the upper surface of the objects 101 and 102 as the outer surface of a product. Further, other curved surfaces can also be cut together with the raised portions.

Moreover, the outer peripheral portion of the integrated objects 101, 102 can be cut to a predetermined shape. Further, a hole, a screw thread or a recess can be formed on the curved surface using the cutting tool 51. Since a gap is formed when the object 101 is abutted against the object 102, holes and the like will be formed with higher accuracy after the friction stir welding has been performed.

When the tool 52 is pulled out of the objects 101, 102 after the termination of the friction stir welding process, a hole is formed in that area. The hole can be cut to form a larger diameter hole, or can be processed as a threaded hole. If a machine screw is to be provided, the position for pulling out the tool 52 should not be at the joint of the friction stir welding.

If cutting is performed before the friction stir welding process, oil used for the cutting process or oil used for cleaning the object after the cutting process may exert a bad influence on the friction stir welding. Moreover, the facet may deteriorate the accuracy of assembly of the two members. However, such problems can be solved if the cutting process is performed after the friction stir welding process. If the cutting of the two object members must be performed before the friction stir welding, the cutting oil used in the process can be removed sufficiently using other devices.

In step S10, if the objects 101 and 102 can be abutted against each other to suit the conditions for the friction stir welding process, the objects 101 and 102 can be mounted on the table 11 at the abutted position for the cutting process. At this time, a support base should be positioned under the abutted portions.

Moreover, after performing friction stir welding on one pair of objects using a first rotary tool, the rotary tool can be exchanged between the main shaft and the tool storage device, and the second joint area of the pair of objects can be friction-stir-welded using a second rotary tool.

Figure 7:
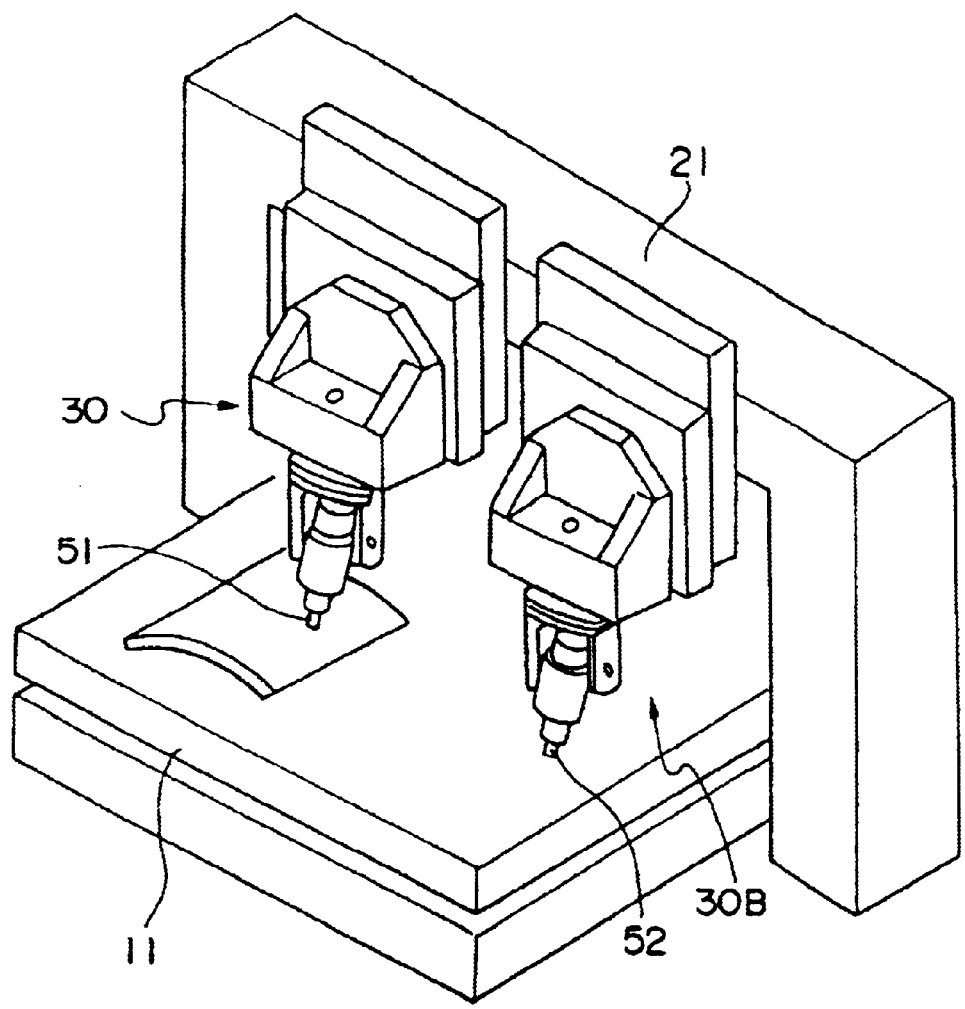
FIG. 7 is a perspective view showing the machining device of another embodiment of the present invention.

The embodiment of FIG. 7 will now be explained. According to this embodiment, two machining devices 30 and 30B are provided on one table 11. The two machining devices 30 and 30B are mounted on one beam 21. The compositions and functions of the two machining devices are the same as the first embodiment, and they are substantially identical. A cutting tool 51 is mounted on the main shaft of one machining device 30. A friction stir welding tool 52 is mounted on the main shaft of the other machining device 30B. Both ends of the beam 21 protrude from the end of the table 11, and when one machining device is working, the other machining device can be sheltered to the protruded beam.

According to the present embodiment, there is no need for exchange of tools. Moreover, since a great insertion force is needed for the friction stir welding process, the bearings and the like of the main shaft must have a high strength. Further, the speed of rotation of the main shaft is generally smaller in the friction stir welding process compared to the cutting process. Therefore, if the machining device 30 is specifically formed for cutting and the machining device 30B is specifically formed for friction stir welding, the friction stir welding device can be manufactured at a relatively low cost.

Figure 8:
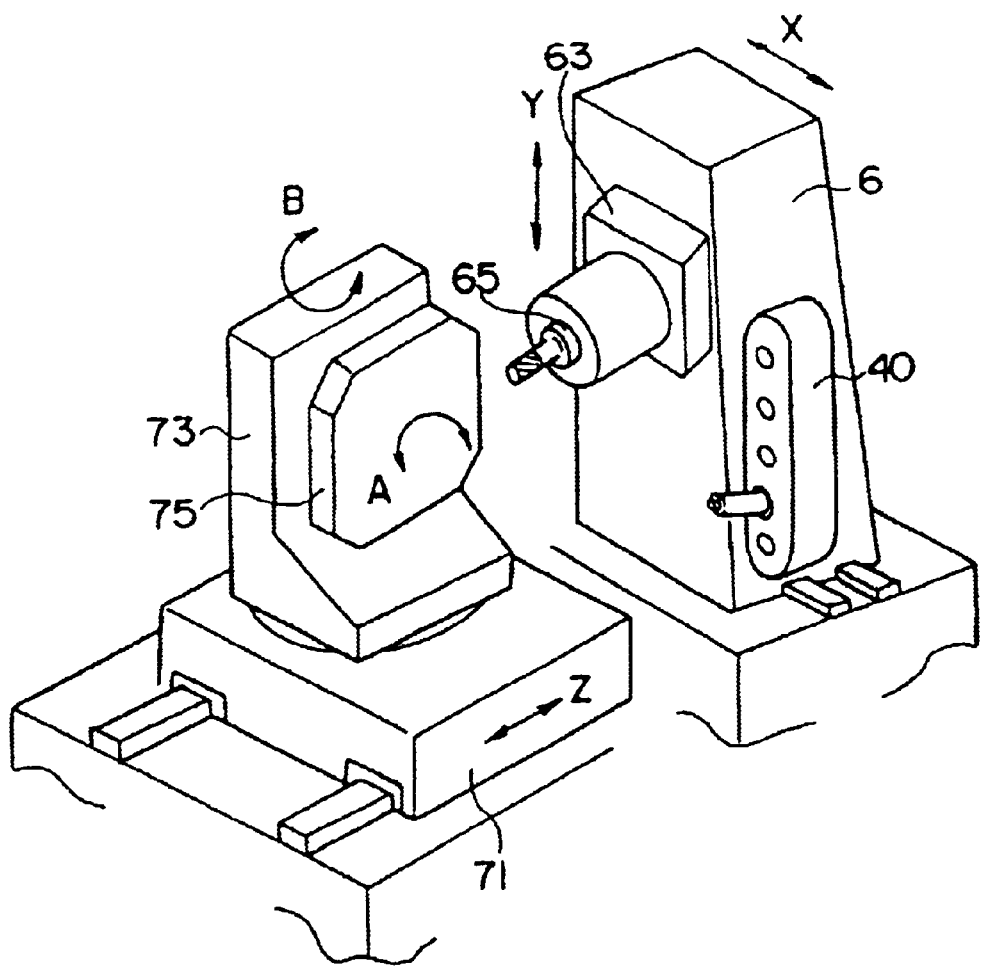
FIG. 8 is a perspective view showing the machining device of another embodiment of the present invention.

The embodiment of FIG. 8 will now be explained. It comprises a column 61 movable in the horizontal (X axis) direction, a base 63 mounted on the column 61 and movable in the vertical (Y axis) direction, a main shaft 65 mounted on the movable base 63 for rotating the mounted tool, a base 71 movable in the horizontal (Z axis) direction along the axis of rotation of the main shaft 65, a rotary base 73 mounted on the movable base 71 and rotatable about an axis B, and a table 75 mounted on the rotary base 73 and rotatable about an axis A. A cutting tool 51 and a friction stir welding tool 52 can be exchanged between the main shaft 65 and the tool storage device 68 using a tool exchange device (not shown). The three linear moving axes and the two rotary axes, a total of five axes, can be controlled simultaneously.

The main shaft 65 is horizontal, and the angle thereof cannot be changed. The table 75 is tilted relative the main shaft 65 to set a position of delayed inclination θ.

Figure 9:
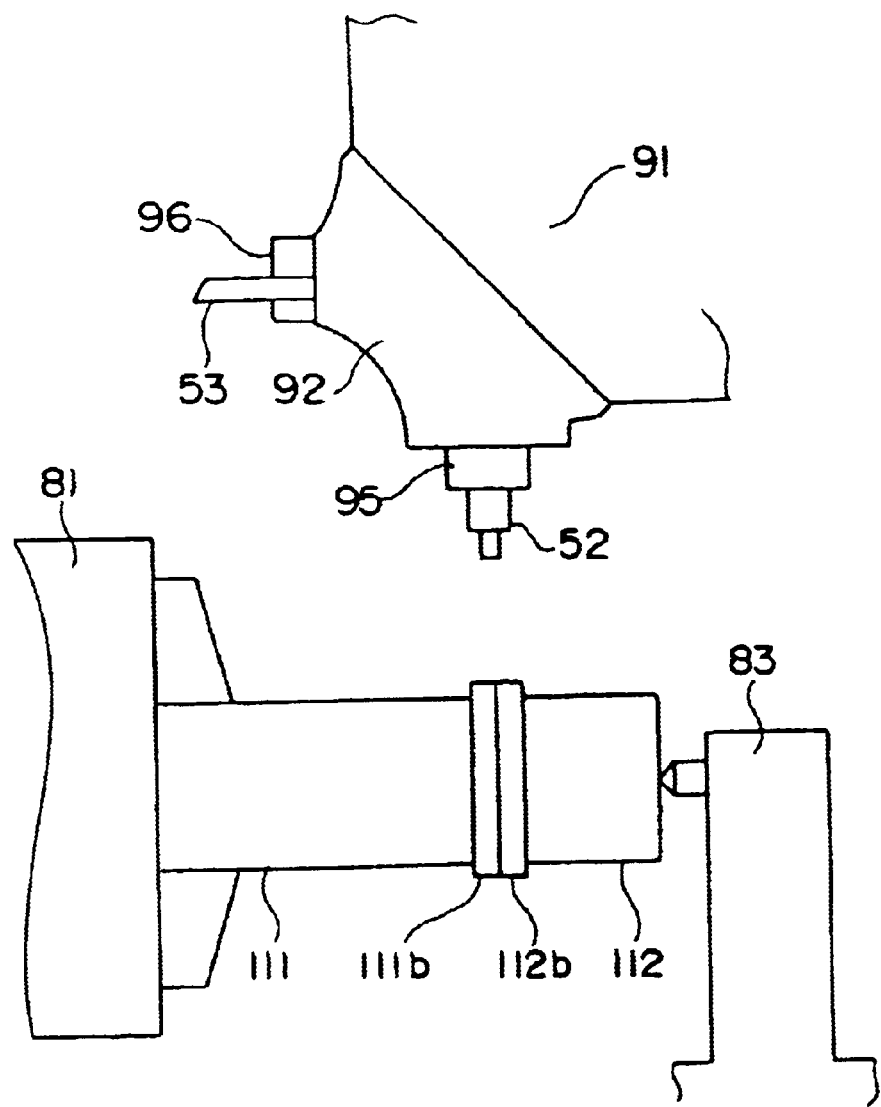
FIG. 9 is a schematic plan view showing the machining device of yet another embodiment of the present invention.

The embodiment of FIG. 9 will now be explained. A work object 111 is chucked onto a rotary base 81. The end portion of a work object 12 is inserted to the tip of the work object 111. The two objects are fit to one another. The free end of the object 112 is supported by a tail stock 83. The abutted portion between the work object 111 and work object 112 is bonded through friction stir welding. The end region of both objects are provided with raised portions 111b and 112b. A moving base 91 is movable along the direction of the axial center of the rotary base 81 and also is movable in the vertical direction. On the moving base 91 there is provided a rotary base or turret 92 that rotates at an angle of 45 degrees. The rotary base 92 is provided with a main shaft 95 for rotating a tool 52. The rotary base 92 is also provided with a holder 96 for mounting a cutting tool 53. It is not necessary to rotate the holder 96. The cutting tool 53 is a bite-type tool.

The end of the work object 112 is inserted to the end of the cylindrical work object 111, abutting the ends together. The abutted portion can be temporarily welded together by arc welding. The objects are then mounted on the rotary base 81, and the object 112 is supported by the tail stock 83. The rotary base 81 and the main shaft 95 are rotated to perform friction stir welding of the abutted portion. Next, the rotary base 92 is rotated to position the cutting tool 53 opposite the friction stir welded portion. Then, by rotating the rotary base 81, the remainder of the raised portion in the welded region is cut off. The friction stir welding process can be performed in the circumferential direction of the cylinder, or it can be performed in any other direction. The cutting using the tool on holder 96 is performed in the circumferential direction.

The object to be welded to the object mounted on a table or a rotary base can be positioned using a robot.

The technical scope of the present invention is not limited to the terms used in the claims or in the summary of the present invention, but is extended to a range in which a person skilled in the art could easily find equivalents based on the present disclosure. For example, a difference in the appearance or size of the compound machining device, or a difference in the size of the tools are included in the scope of the present invention.

According to the present invention, the cutting process and the welding process can be performed by a single device, which makes it possible to reduce the equipment cost, the installation space, the plant area, the lead time and the machining cost.

What is claimed is:

1. A friction stir welding device comprising:
a detector adapted for detecting the torque current of a motor rotating a friction stir welding tool during a friction stir welding process; and
a control unit adapted for controlling the depth of insertion of said friction stir welding tool into a work object based on a detected value from said detector.

2. A friction stir welding device comprising:
a main shaft adapted for rotating a friction stir welding tool;
a first moving device adapted for relatively moving said main shaft and a work object to effect insertion of said friction stir welding tool into said work object;
a second moving device adapted for relatively moving said main shaft along a joint line of said work object;
a detector adapted for detecting the torque current of a motor rotating said friction stir welding tool when inserting said friction stir welding tool into said work object; so as to provide a detected value; and
a control unit adapted for correcting the coordinate value of said work object based on the detected value of said detector, so as to provide a corrected value, and for driving said first moving device based on the corrected value.

3. The friction stir welding device according to claim 1, wherein said motor is an AC servomotor or a DC servomotor.

4. The friction stir welding device according to claim 1, wherein said detector is a detector means for detecting the torque current of the motor rotating said friction stir welding tool during said friction stir welding process.

5. The friction stir welding device according to claim 4, wherein said control unit is a control unit means for controlling the depth of insertion of said friction stir welding tool into the work object based on the detected value from said detector means.

6. The friction stir welding device according to claim 1, wherein said control unit controls up and down motion of said friction stir welding tool into said work object.

7. The friction stir welding device according to claim 2, wherein said motor is an AC servomotor or a DC servomotor.

8. The friction stir welding device according to claim 2, wherein said detector is a detector means for detecting the torque current of the motor rotating said friction stir welding tool when inserting said friction stir welding tool into said work object.

9. The friction stir welding device according to claim 8, wherein said control unit is a control unit means for correcting the coordinate value of the work object based on the detected value from said detector means and for driving said first moving device based on the corrected value.

10. The friction stir welding device according to claim 9, wherein the first and second moving devices respectively are a first moving means for relatively moving said main shaft and said work object to effect insertion at said friction stir welding tool into said work object and a second moving means for relatively moving said main shaft along said joint line of said work object; and said main shaft is a main shaft means for rotating said friction stir welding tool.

* * * * *